US008645376B2

(12) United States Patent
Robinson et al.

(10) Patent No.: US 8,645,376 B2
(45) Date of Patent: Feb. 4, 2014

(54) METHOD AND SYSTEM FOR MANAGING RECENT DATA IN A MOBILE DEVICE LINKED TO AN ON-DEMAND SERVICE

(75) Inventors: Larry Robinson, Nevada City, CA (US); Erik Forsberg, Los Angeles, CA (US)

(73) Assignee: salesforce.com, inc., San Francisco, CA (US)

( * ) Notice: Subject to any disclaimer, the term of this patent is extended or adjusted under 35 U.S.C. 154(b) by 256 days.

(21) Appl. No.: 12/435,299

(22) Filed: May 4, 2009

(65) Prior Publication Data

US 2010/0088316 A1    Apr. 8, 2010

Related U.S. Application Data

(60) Provisional application No. 61/049,852, filed on May 2, 2008.

(51) Int. Cl.
*G06F 17/30* (2006.01)
*G06F 15/16* (2006.01)

(52) U.S. Cl.
USPC .......................................... 707/737; 707/621

(58) Field of Classification Search
USPC ................................ 707/737, 621
See application file for complete search history.

(56) References Cited

U.S. PATENT DOCUMENTS

| 5,644,725 | A | 7/1997 | Schmerer |
| 6,021,409 | A | 2/2000 | Burrows |
| 6,226,635 | B1 | 5/2001 | Katariya |
| 6,233,616 | B1 | 5/2001 | Reid |
| 6,434,550 | B1 | 8/2002 | Warner et al. |
| 6,732,100 | B1 | 5/2004 | Brodersen et al. |
| 6,816,850 | B2 | 11/2004 | Culliss |
| 7,146,155 | B2 | 12/2006 | Kouznetsov |
| 2002/0087661 | A1* | 7/2002 | Matichuk et al. ............ 709/218 |
| 2003/0131232 | A1 | 7/2003 | Fraser et al. |
| 2004/0123153 | A1* | 6/2004 | Wright et al. ................ 713/201 |
| 2005/0071740 | A1 | 3/2005 | Chee et al. |
| 2005/0108526 | A1 | 5/2005 | Robertson |
| 2005/0222981 | A1 | 10/2005 | Lawrence et al. |
| 2005/0223022 | A1 | 10/2005 | Weissman et al. |
| 2006/0235715 | A1 | 10/2006 | Abrams et al. |
| 2006/0235831 | A1 | 10/2006 | Adinolfi et al. |
| 2006/0242164 | A1 | 10/2006 | Evans et al. |

(Continued)

OTHER PUBLICATIONS

Leong et al, On Adaptive Caching in Mobile Databases, Published 1997, pp. 302-309.*

(Continued)

*Primary Examiner* — Alex Gofman
(74) *Attorney, Agent, or Firm* — Haynes Beffel & Wolfeld LLP; Ernest J. Beffel, Jr.

(57) ABSTRACT

Systems and methods for managing recent data items in a database. A method typically includes determining whether a data object managed by an on demand service is designated as able to be accessed by a user at a mobile device and storing locally at a mobile device a plurality of most recently used items viewed for a data object designated as able to be accessed by a user at a mobile device. The method also typically includes determining a single most recently used set from among the stored plurality of most recently used items viewed for at least one data object designated as able to be accessed by a user at a mobile device.

19 Claims, 9 Drawing Sheets

(56) References Cited

U.S. PATENT DOCUMENTS

| | | |
|---|---|---|
| 2007/0016553 A1 | 1/2007 | Dumais et al. |
| 2008/0010243 A1* | 1/2008 | Weissman et al. ................ 707/2 |
| 2008/0098301 A1* | 4/2008 | Black et al. ................... 715/246 |
| 2009/0150569 A1* | 6/2009 | Kumar et al. ................. 709/248 |

OTHER PUBLICATIONS

U.S. Appl. No. 60/828,192, filed Oct. 4, 2008, for Craig Weissman.

* cited by examiner

MRU table definition core.mru

| Name | Null? | Type |
|---|---|---|
| ORGANIZATION_ID | NOT NULL | CHAR(15) |
| USERS_ID | NOT NULL | CHAR(15) |
| KEY_PREFIX | NOT NULL | CHAR(3) |
| ENTRY_DATE | NOT NULL | DATE |
| ENTITY_ID | NOT NULL | CHAR(15) |

FIG. 4

METHOD AND SYSTEM FOR MANAGING RECENT DATA IN A MOBILE DEVICE LINKED TO AN ON-DEMAND SERVICE

CROSS-REFERENCES TO RELATED APPLICATIONS

This application claims the benefit of U.S. Provisional Application Ser. No. 61/049,852, filed May 2, 2008, the disclosure of which is incorporated herein by reference in its entirety. U.S. Provisional Application Ser. No. 61/049,852 incorporates by reference the following U.S. applications, each of which are hereby incorporated by reference herein in their entireties:
1) U.S. patent application Ser. No. 11/293,857, filed Dec. 2, 2005, and entitled "METHODS AND SYSTEMS TO OPTIMIZE TEXT SEARCHES OVER STRUCTURED DATA IN A MULTI-TENANT ENVIRONMENT"; and
2) U.S. patent application Ser. No. 11/757,087, filed Jun. 1, 2007, and entitled "METHOD AND SYSTEM FOR PUSHING DATA TO A PLURALITY OF DEVICES IN AN ON-DEMAND SERVICE ENVIRONMENT".

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The rapid and efficient retrieval of accurate information and subsequent delivery of this information to the user system in a transparent manner that is easy to understand is desirable.

Unfortunately, conventional database approaches might process a query relatively slowly and become inefficient if, for example, the number of queries received by the database system is relatively high. A database system may also process a query relatively slowly if, for example, a relatively large number of users substantially concurrently access the database system.

Additionally, when providing data to users of mobile devices, there may be a delay between the time data was changed by a user and the time it may appear in search results. This can be inconvenient for users who, for example, use a desktop computer system and then expect changed data to be readily available on a mobile device.

Accordingly, it is desirable to provide techniques enabling an efficient pushing of data to a plurality of devices that use the database system. It is also desirable to manage the data available on a mobile device so that a user has access to data that has been pushed to the mobile device based on pre-set criteria as well as recently viewed data.

SUMMARY

The present invention relates generally to managing recent data items in a database, and more particularly to managing recent data in a mobile device linked to an on-demand database system or service.

According to one embodiment, a method is provided that typically includes determining whether a data object managed by an on demand service is designated as able to be accessed by a user at a mobile device and storing locally at a mobile device, a plurality of most recently used items viewed for a data object designated as able to be accessed by a user at a mobile device. The method also typically includes determining a single most recently used set from among the stored plurality of most recently used items viewed for at least one data object designated as able to be accessed by a user at a mobile device. The method is typically implemented in a computer system having one or more components in communication over one or more network links. In certain aspects, the method further includes updating a most recently used set in a server component of the on demand service to reflect the most recently used set for the mobile device. Computer systems for implementing the method are also provided.

According to another embodiment, a method is provided for managing data stored on a mobile device in remote communication with an on-demand database system. The method typically includes determining whether a first data object managed by an on demand service is designated as able to be accessed by a user of a mobile device, and determining a first set of data items from the first data object based on user-defined criteria. The method also typically includes determining a set of one or more most recently used (MRU) data items for the first data object, the MRU data items including data items that have been recently viewed by a user of the mobile device, and storing locally at the mobile device a second set of data items from the first data object, the second set including data items from the first set of data items and from the MRU data items. The method steps are typically performed in one or more components of the database system. In certain aspects, the method further includes displaying at least a portion of the second set of data items on the mobile device, wherein the MRU data items and first set of data items are merged together when displayed.

According to a further embodiment, a method is provided for managing data stored on a mobile device in remote communication with an on-demand database service. The method typically includes determining a plurality of data objects managed by an on demand service that are designated as able to be accessed by a user of a mobile device, and determining a first set of data items from the plurality of designated data objects based on user-defined criteria. The method also typically includes determining one or more of most recently used (MRU) data items viewed for the plurality of designated data objects by a user of the mobile device, and storing locally at the mobile device a second set of items from the designated plurality of data objects, the second set including data items from the first set of data items and from the MRU data items. In certain aspects, the method further includes displaying at least a portion of the second set of data items on the mobile device, wherein the MRU data items and first set of data items are merged together when displayed.

According to still a further embodiment, an on demand database system is provided that typically includes a database service having database storage that stores a plurality of data objects accessible by a plurality of users, one or more mobile devices that communicate remotely with a component of the database service, and one or more logic modules executing on one or more components of the database service. The logic module(s) are typically configured to determine a plurality of data objects managed by the database service that are designated as able to be accessed by a user of a mobile device, and to determine a first set of data items from the plurality of designated data objects based on user-defined criteria. The logic module(s) are also typically configured to determine one or more of most recently used (MRU) data items viewed for the plurality of designated data objects by the user of the mobile device, and to send data to the mobile device identifying a second set of data items for storing locally at the mobile device, the second set including data items from the first set of data items and from the MRU data items.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 4 illustrates an example of a table definition of an MRU according to one embodiment.

DETAILED DESCRIPTION

General Overview

Systems and methods are provided for managing recent data items in a database, and more particularly to managing recent data stored to a mobile device linked to an on-demand database service. These techniques for managing data enable embodiments to provide seamless displays of data on mobile devices so that users are able to view relevant data based in part on the user's behavior.

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the term query plan refers to a set of steps used to access information in a database system.

Next, mechanisms and methods for managing recent data items in a database system will be described with reference to example embodiments.

System Overview

Figure 1:
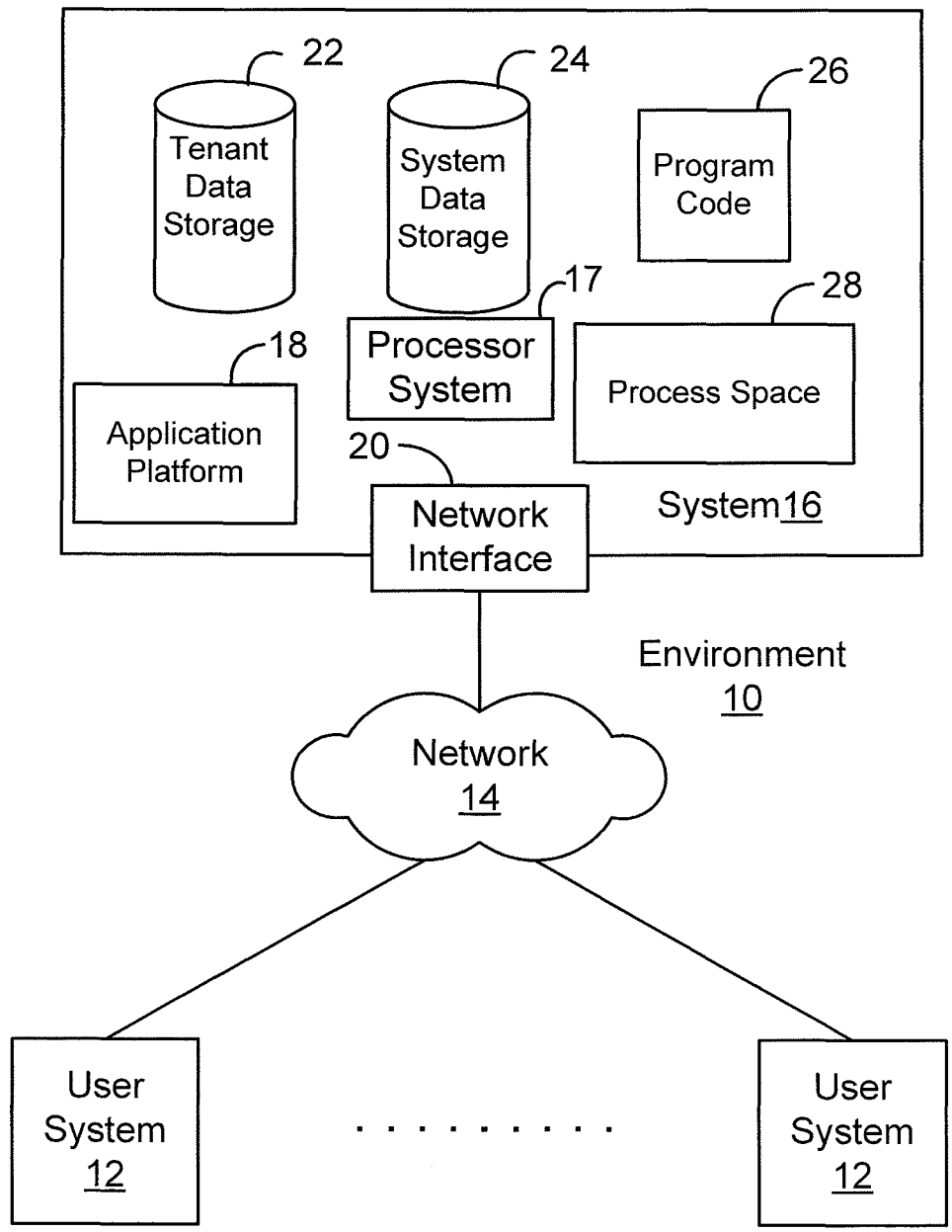
FIG. 1 illustrates a block diagram of an environment wherein an on-demand database service might be used.

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications (application processes) as well as provide related data, code, forms, web pages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements or components of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, or mobile devices such as a laptop, PDA, cell phone, or any wireless access protocol (WAP) enabled device, or any other computing device capable of interfacing directly or indirectly to the Internet or other network connection. Examples of specific mobile devices include an iPhone™ and a Blackberry™. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
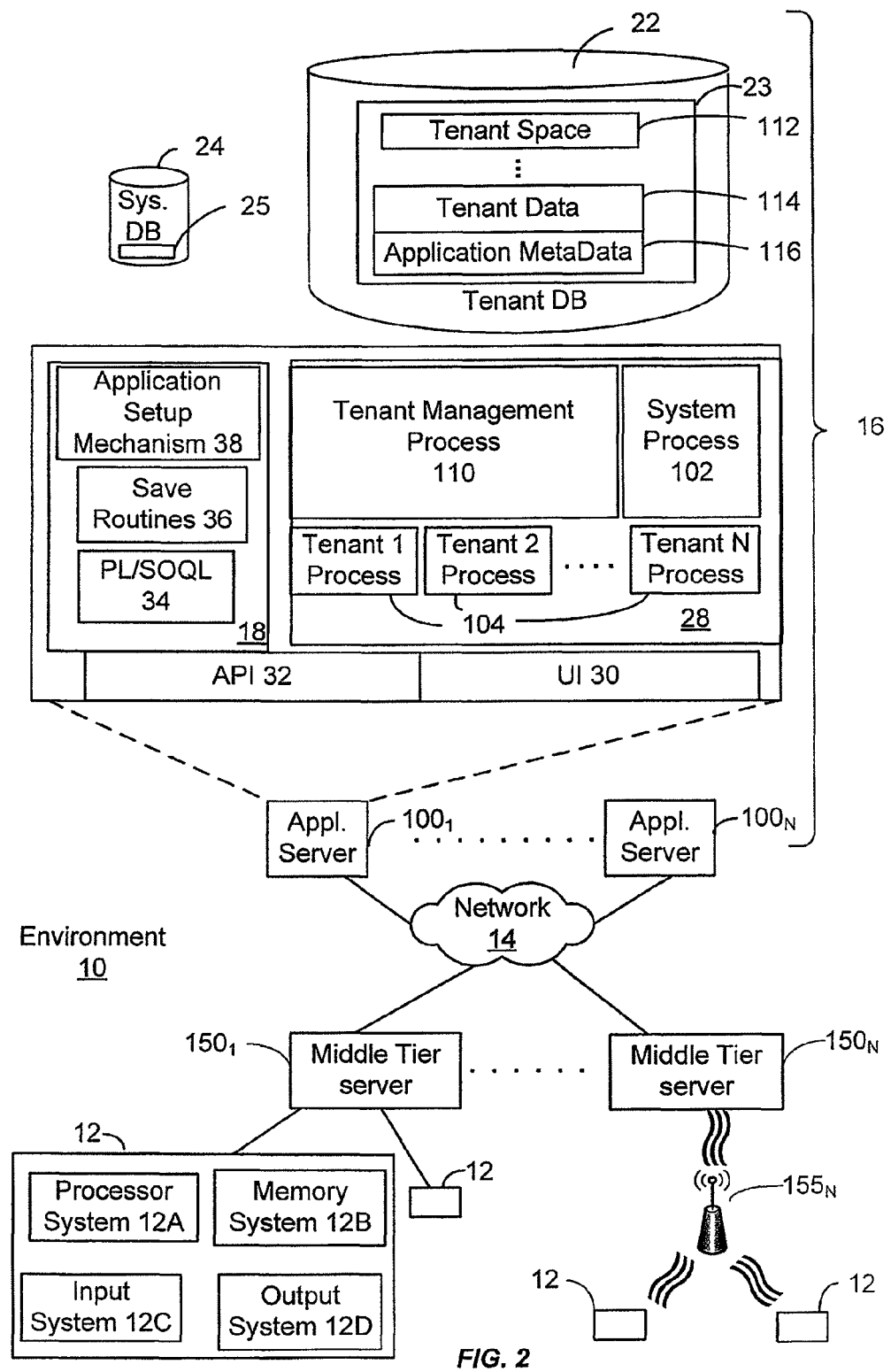
FIG. 2 illustrates a different view of the environment of FIG. 1.

FIG. 2 also illustrates environment 10. In the embodiment illustrated by FIG. 2, one or more middle tier servers 150 exist between system 16 and user systems 12. Middle tier servers 150 are termed middle tier because these servers are interposed between the system 16 and the user systems of a particular organization. As described above, network 14 may be used for communication between system 16 and system 12. In one embodiment, the same network 14 is used between a middle tier servers 150 and user systems 12. In another embodiment, a different network is used between a middle tier server 150 and user systems 12. For example, a tenant network $155_N$ may be a wireless network, and network 14 may provide communicable coupling via fiber-optics. Each network 14 or tenant network $155_N$ may also be a combination of different types and protocols.

In one embodiment, each middle tier server 150 manages data of a different organization or tenant, however other embodiments may include information of more than one tenant coupled to a single middle tier server. In another embodiment, each middle tier server 150 may contain a plurality of servers, which collectively provide communication between system 16 and user systems 12 of an organization. The tenant network 155 of each organization may be of a different type (e.g. wireless, optical, . . . ) or protocol. Examples of wireless protocols include Wireless LAN, Global System for Mobile Communications (GSM), Personal Communications Service (PCS), D-AMPS, Wi-Fi, General Packet Radio Service (GPRS), 3G wireless systems such as those using Code division multiple access (CDMA), HIgh PErformance Radio LAN (HIPERLAN), and Worldwide Interoperability for Microwave Access (WiMAX).

In FIG. 2, elements or components of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Pat. No. 7,730,478, entitled, "METHOD AND SYSTEM FOR ALLOWING ACCESS TO DEVELOPED APPLICATIONS VIA A MULTI-TENANT ON-DEMAND DATABASE SERVICE," issued Jun. 1, 2010 to Craig Weissman, and hereby incorporated in its entirety herein for all purposes. Invocations to applications may be detected by one or more system processes, which manages retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc.

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled "CUSTOM ENTITIES AND FIELDS IN A MULTI-TENANT DATABASE SYSTEM", issued Aug. 27, 2010 to Craig Weissman, and which is hereby incorporated herein by reference, teaches systems and methods for creating custom objects as well as customizing standard objects in a multi-tenant database system.

Searching and Viewing Data

Figure 3:
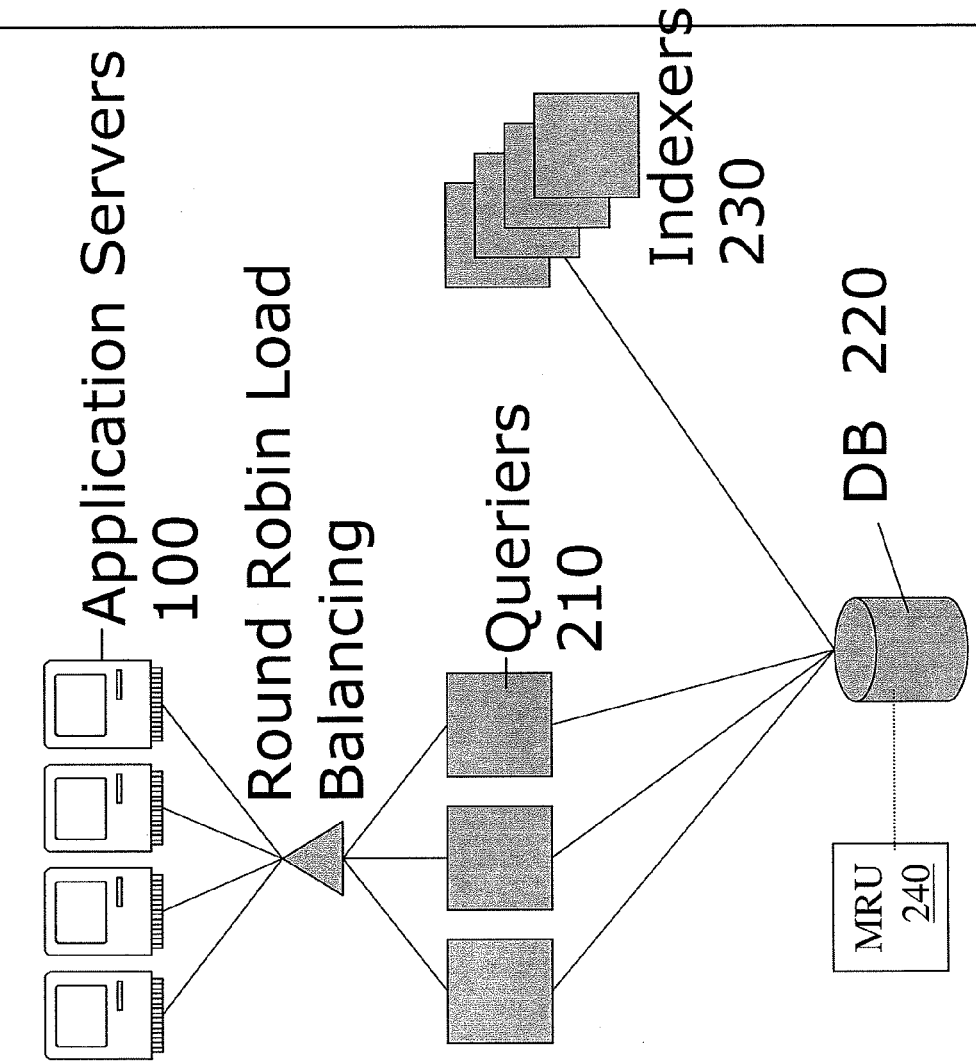
FIG. 3 illustrates an architecture of a search system according to one embodiment.

FIG. 3 illustrates the architecture of a search system 200 according to one embodiment. In one aspect, the search system of FIG. 3 is implemented in the multi-tenant database system 16 of FIG. 1. As shown, search system 200 includes one or a plurality of query servers 210 ("queriers") communicably coupled to application server(s) 100 and a database system 220 (e.g., system database 106 and/or tenant database 108 of FIG. 2). Queriers 210 are also communicably coupled with indexers 230. Indexers 230 are indexing processes that query and index the database 220. It should be appreciated that an indexer 230 can be implemented in a separate server or computer system or it may be implemented or may execute in a query server 230 or in an application server 100, and multiple indexers may execute in different systems. Similarly, a querier 210 may be implemented or may execute in a separate server or computer system or it may be implemented or may execute in an application server 100.

In typical operation, an application server 100 (or middle tier server), e.g., upon receipt of a search query from a user of a mobile device, sends a query request to a querier 210. Where multiple queriers 210 are present, a load balancing (e.g., round robin) process may be implemented to direct the query to a specific querier 210. Typically, the query request is in the form of an HTTP request including a search parameter (e.g., term or terms to be searched), although other forms and protocols may be used. The querier 210 that receives the query performs a search by reading the search index(es) created by the indexers 230 to determine one or more matches with the term(s) provided. The results are returned to the requesting application server 100. The results are typically returned with a base "relevancy" score as determined by the underlying search engine process, e.g., Lucene. Typically, a pre-designated upper limit of N (e.g., 1000, 2000, 5000, etc.) search index results is provided to the querier 210 by the search engine in order of relevancy.

As data is added or changed in the database, a search indexer 230 (a background process) asynchronously updates the search index. In one aspect, a search index is stored to the database 220, but it may be stored to a separate storage system. In a multi-tenant database environment, in one aspect, a separate index is created for each organization. Each organization may have one or more separate indexers 230 executing on its behalf, or one or more indexers 230 may be shared between organizations. In one aspect, for example, one indexer executes per instance per indexing host.

Upon a database access, insert or update event, a timestamp is assigned to the viewed, added or modified data. For example, in one aspect, modified or added data is copied to a "to be indexed" table including fields for data type and timestamp. This timestamp indicates the date (and time) from which all data in the table needs to be indexed. As the indexer executes, to determine the set of data that needs to be indexed, the indexer queries a table's data looking for rows which have a system_modstamp>=the timestamp in the to be indexed table, where system_modstamp is a field that includes the time that the system last modified or changed the data row. The returned rows represent the data that needs indexing. In one aspect, chunks of row IDs are read from the "to be indexed" table. For each ID, the indexer queries the database for the source row of data and copies all the relevant fields (e.g., fields of a type that may be indexed, such as text, phone number, e-mail address, etc.) to an index file in the appropriate index format.

As an index for an organization grows, it may be partitioned. For example, a large organization may have several physical partitions in the search index. Additionally, depending on the load on the system, there may be a latency between when data is added or modified in the database and when it appears in an index. To hide the impact of this lag time from the user, in one aspect, the user's most recently used records and objects are tracked or cached for inclusion in or with the search results as will be discussed in more detail below.

Most Recently Used (MRU) Cache

Search queries run against a search index that is built from an organization's data. As organization data is added or changed (e.g., a database insert or update event), a background process (the search indexer) asynchronously updates a search index. Under peak system load, the volume of data change in the system is such that the search index update process can run behind, e.g., lag up to 5 minutes or more. This means there can be a lag in time between the time data is entered or changed in the system and the time it may appear in search results. This is especially inconvenient for users who make a change then immediately search for it and are unable to find it because of search indexing latency.

To optimize the search results, in one embodiment, the system maintains a per-user cache of recent objects the user has added or changed. For example, the cache may hold the last N (e.g., any number ranging up to 50 or 100 or more) objects the user has added or modified, or it may hold all objects a user has added or modified within a specified time period, e.g., within the last 2 to 5 or more minutes. With reference to FIG. 3, this cache will be referred to as the Most Recently Used list or MRU 240. In certain aspects, the MRU 240 is stored in the database 220 keyed by organization id and user id. Alternatively, the MRU 240 may be stored separately from the database 220. FIG. 4 shows an example of a table definition of an MRU according to one embodiment. In one aspect, when a search query is received, the system checks the search index for relevant "matching" results. The system also searches the MRU for matching objects and returns MRU search results. For example, an application server 100 may itself search or scan the MRU to include relevant (e.g., mobilized) MRU items with the search results after it has received index-matching results from a querier 210, or a querier 210 may search or scan the MRU and incorporate relevant MRU items in the search results before providing the results to the application server 100. The index search results and MRU search results are returned to, and displayed at, a requesting user system 12. In one aspect, the index search results and the MRU search results are distinguished or displayed separately.

In another aspect, the results of the MRU search are mixed in with the other search results, so users won't know explicitly that some results came from the search index and some from the MRU. This is useful in cases where, for example, only one term (e.g., the first term) of multiple search terms is used as the search parameter. For example, the MRU results may be wrong for the search because if it only uses the first term: e.g., if they search for "scott h", the MRU search just looks for "scott" and so would find scott yancey. This may confuse the user so it is desirable to limit the MRU searching to just the unindexed time. In one aspect, only one term, such as the first term, is used in the search of the MRU because this simple query can be implemented using a database lookup instead of a true search index.

Thus, the present invention, advantageously allows a user who adds or edits data and then searches for it to see the recently added or changed data in their search results even if the search indexing process is behind or lagging.

Pushing Data to Devices

Remote devices or thin client devices such as Wireless Handhelds or other mobile devices offer finite resources. Such devices have a limited amount of memory and processing power, and often times connect across a wireless network at speeds far below dial-up modem speeds. Techniques employed by example embodiments described herein can enable database systems to work with such constrained device environments by addressing what data is sent to the device, and when.

Accordingly, embodiments are suited for use with: devices with a small form factor, limited interactive capability, limited display size, limited memory or storage capacity, limited processing power and short battery life; and/or with networks that have/are not consistently available, slow data transfer rates, erratic data transfer services, and no consistent standards; with data having massive quantity and that is not organized for mobile users; with users that have short attention spans, no patience, are on the move, and are routinely in awkward or limited usage situations; and with managers who have security concerns and where applications, devices, and users require a new management layer.

In one embodiment, a communication model among the system 16, middle tier servers 150, and user devices 12 is based on a bi-directional transaction of data at an atomic level. This allows field level changes to be tracked between paired databases across a wireless network without the need for reliable and constant network connectivity. By implementing a transactional system that manages its own end to end delivery management, designed with store and forward methodology, the application and the user are shielded from the time, complexity and unreliability of the underlying transport mechanism.

Figure 5:
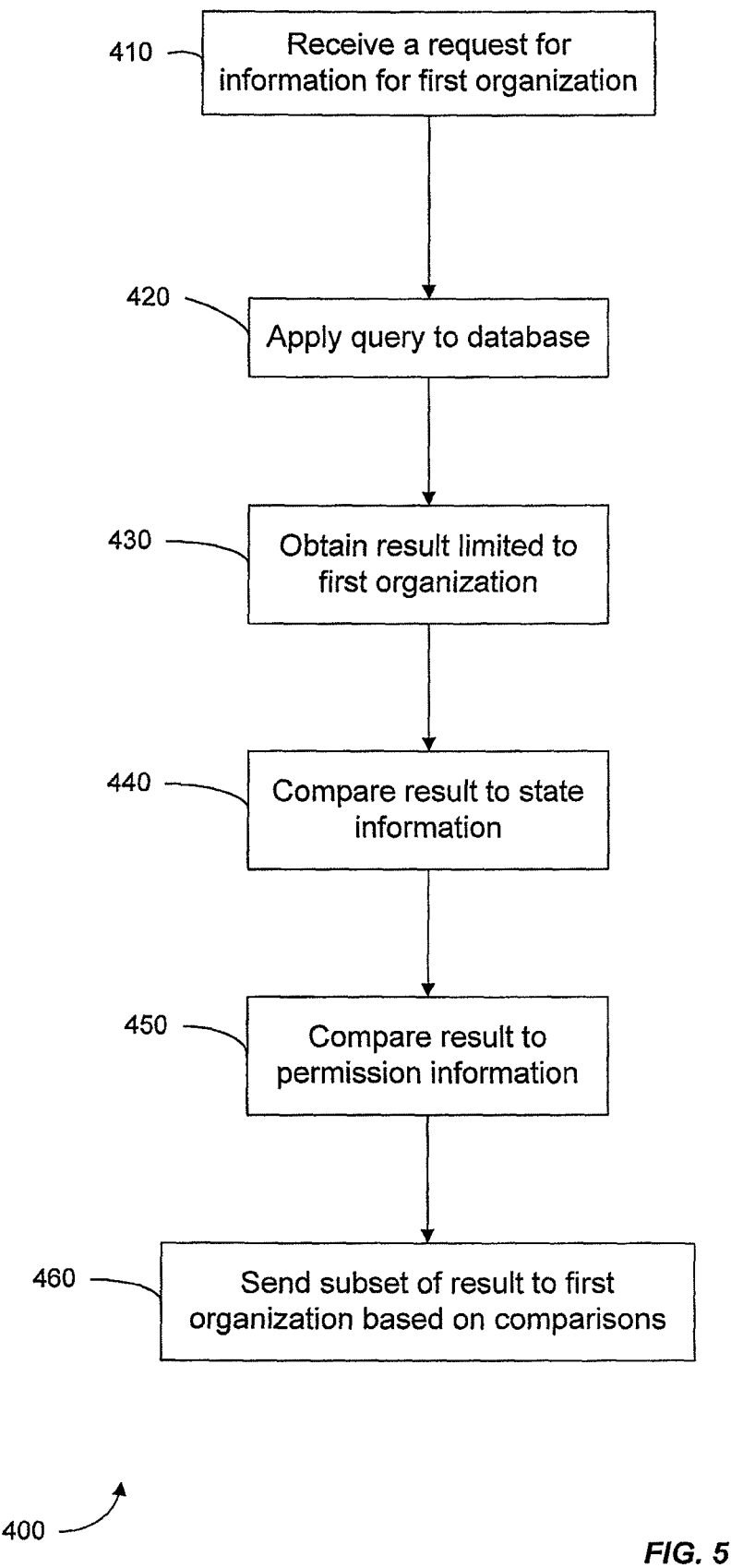
FIG. 5 is an operational flow diagram illustrating a high level overview of a technique for pushing data to a plurality of devices in an on-demand service environment in an embodiment.

FIG. 5 is an operational flow diagram illustrating a high level overview of a technique 400 for pushing data to a plurality of devices in an on-demand service environment in an embodiment. In an embodiment, the technique for pushing data to a plurality of devices in an on-demand service environment shown in FIG. 5 is operable with the multi-tenant database system 16. As shown in FIG. 5, the process provides pertinent information to an organization, e.g. at a server, from a database that potentially contains information for a plurality of organizations.

Figure 6:
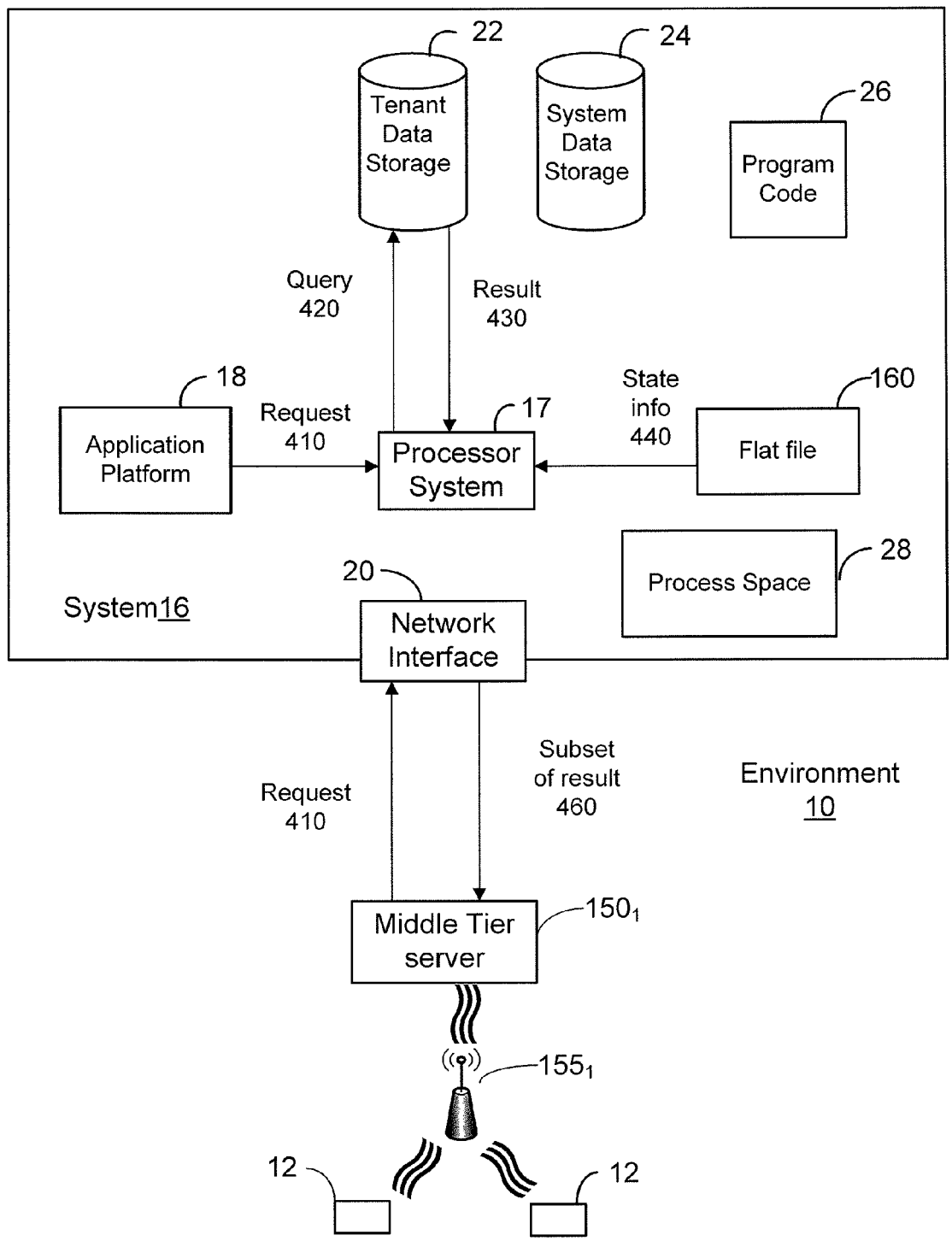
FIG. 6 illustrates a technique of FIG. 5 performed according to an embodiment.

At block 410, a request for information for a first organization is received. For example and without limitation, this can include a middle tier server $150_1$ of the first organization receiving a request from a user of a mobile device 12 and sending a request via network 14 to system 16. This step is shown in FIG. 6, which illustrates a technique of FIG. 5 performed in an environment 10 according to an embodiment. Alternatively, the request for information is generated internally to the system 16. For example, application platform 18 may send the request for information for the first organization to processor system 17.

The internal or external request may be responsive to a set of criteria. In one embodiment, if any one of these criteria are met then the request is sent. For example, one criteria is a predetermined time period, thus providing a scheduled update, such as, every 15 minutes a request is sent for information for the first organization.

At block 420, a query is applied to a database, where the query includes that the information is for the first organization. By way of example and without limitation, this can include instructions to processor system 17 querying tenant data storage 22, as shown in FIG. 6. The query may have certain criteria, such as limiting data to the first organization, a specific user, the first N contacts or other objects, objects with specific attributes, and data having a certain relationship to the specific data returned by the query.

At block 430, a result of the query is obtained where the result is limited to information associated with the first organization. At block 440, the result is compared to state information that indicates what information is present at a middle tier server $150_1$. By way of example and without limitation, this can include state information stored in a flat file 160, which may be a separate data storage or the same as any of the other storages mentioned herein. The state information tracks which data was previously sent to server $150_1$ and which data has changed since that data was sent.

At block 450, the result is compared to permission information that indicates which portion of the result that devices at the first organization are permitted to view. At block 460, based on the comparisons, a subset of the result is sent to middle tier server $150_1$.

In one embodiment, the entire result is sent, e.g., during an initial extraction. Certain criteria may be used to determine when an entire result is sent. These criteria include a reset condition, a change in rules for the information associated with the first organization, an edit made to a portion of the data, a request for the entire result by the server of the first organization, and a size of the subset of the result being larger than a predetermined amount. The edit to a portion of the data may come from an administrator of the first organization or just a user system of a device. In one embodiment, if the size of the subset is too large then a fault is sent to middle tier server 150, which then returns a request for an entire extraction.

In one embodiment, after the middle tier server 150 receives the subset of the result, server 150 can combine the subset with existing data in order to form a quasi-identical copy. In one aspect of an embodiment, this copy is quasi-identical in that it is not necessarily an exact match with the data on system 16. It may be up to date only with respect to the most recent push of data, which may, for example, be one or more seconds or minutes in the past. As will be discussed below, in one embodiment, additional mobilized MRU data is identified for inclusion on the mobile device.

Sending Data to Client Device

Once the middle tier server 150 has the new subset of data, it may send the entire subset to a user system 12, also called a device. Often the device will not be able to hold all of the data that is allowed to see. Accordingly, some embodiments use filters, criteria, relevancy rules, or certain events to determine which data to send to the device.

Additionally, in order to reduce the number of times the user needs to get information from the network because it is not available on the device, some embodiments put as much data as possible on the device in advance. For users who work with relatively small data sets, this is simple to achieve by just dumping everything onto the device.

However, in many instances the pool of possible data is in the range of hundreds to thousands of megabytes. So the challenge becomes to determine the best set of active filters to apply per user to that data set to ensure that for every user, the data on the device is highly relevant to the task they are currently performing. Accordingly, embodiments use a relevance data model. Relevance filters can be set based on, for example, user schedule, location, active customer list, open work order inventory, or any other number of job, time or individual specific criteria.

In one embodiment, the frequency and type of exchange is governed by mobile profiles and application-specific requirements. The mobile profile rules are set to match data flow to the capability of the target device and needs of the mobile user. Application specific rules are set to match the relevance of the data to the specific mobile user or user groups and the set of field tasks or jobs to be performed. A goal of the relevance-based rule set is to ensure that data from the enterprise application is delivered to the device ahead of when the user will need it.

A profile is the configuration of the mobilized application with the following exemplary purposes: Define the subset of data fields the user wants to see on the device; Filter the amount of data the user wants to have on the device; Store the business logic required to retrieve data using methods to add, delete, or update data through system 16.

The first two features are directed toward limiting the data brought down to the handheld device. On the limited display of a typical mobile device, the user might not want to see all the data fields available through their desktop account. That is, each data record will normally have many more fields than can benefit the mobile user. As an example, the user may want to see Name, Address, and Phone Number but not Department Code. Moreover, the profile provides a filtering process to select only data records matching specific constraints, such as a range of postal codes or date of last order.

The third profile feature provides a way to further describe processes related to each of the data management primitives for added generality. In this general way, the user or administrator can define the dataset to be maintained for the individual mobile user. Profiles are usually defined by role so one profile may apply to all major account salespeople, for example. Profiles can be changed, cloned or revised using very flexible console capabilities to achieve exactly the distribution of data most appropriate to the organization and individual users.

Figure 7:
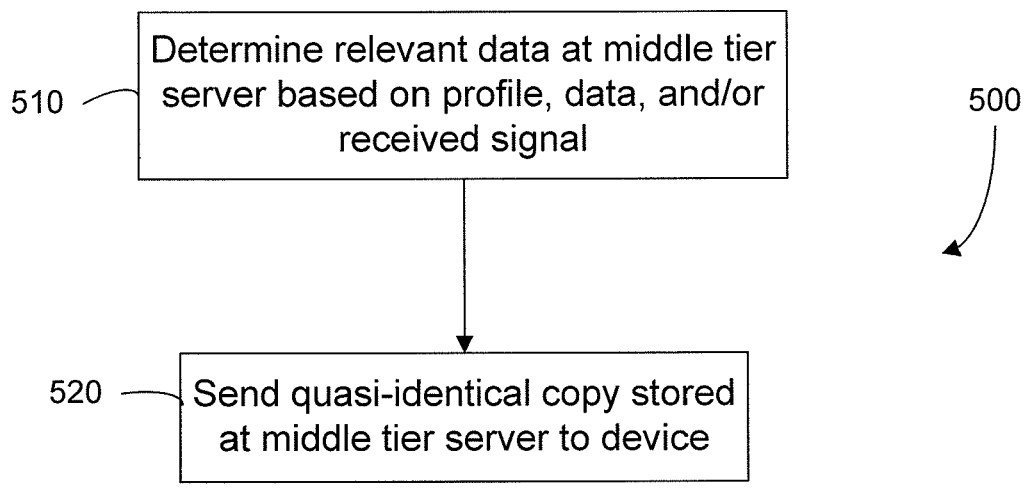
FIG. 7 is an operational flow diagram illustrating a high level overview of part of a scheduled process for sending data to a device in an embodiment.

FIG. 7 is an operational flow diagram illustrating a high level overview of part of a scheduled process 500 for sending data to a device in an embodiment. At block 510, the middle tier server determines the relevant data to send to the device based on a profile, data, and/or received signal. By way of example and without limitation, this data anticipation is achieved by using parameters that are highly application specific. For example, in a sales force automation (SFA) application where the user is a field sales representative, that users relevance parameters will likely focus on their scheduled meetings, active deals, proximate customers, and whatever other key parameters influence the pattern of what data they use most often on a daily basis. The user's enterprise application data set can then be actively and constantly examined against these parameters, and data can be constantly sent to, and removed from, the device to maximize the likelihood that the data on the device at any given instant is most likely to be the data that user needs to perform the task they are currently working on.

Figure 8:
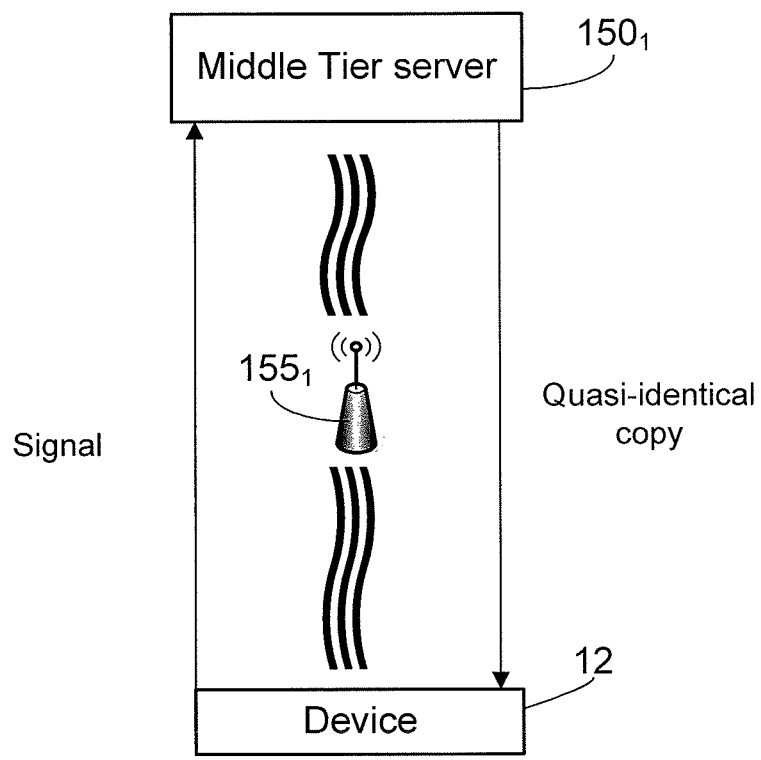
FIG. 8 shows a flow of data in a scheduled procedure for sending data to a user device in an embodiment.

In one embodiment, a signal is sent from device 12 to middle tier server 150, and the signal is used to determine relevant data. FIG. 8 shows a flow of data in a scheduled procedure for sending data to a user device in an embodiment. In one aspect of an embodiment, the signal is simply a request for particular data. The middle tier server 150 would then deem this data relevant. In another aspect, the signal is geographical information, such as a GPS signal, which may then be used to determine the relevant data. For example, based on the position of the user, data for contacts, which are in close proximity to the mobile user, may then be sent to the device 12. This data is related to information on the device, such as user information identifying the identity of the user. Additionally, embodiments provide integration with third party services such as Location Based Services (LBS), providing such features as auto provisioning the mobile device with customer locations that are within miles of the salespersons whereabouts, offering access to maps and directions to a customer site, etc.

As will be described in more detail below, MRU data is also included in some embodiments, to be merged with data displayed on the mobile device. In this manner, a user obtains and is able to view on their mobile device filtered data per their, or their organization's, criteria as well as pertinent recently viewed information.

In one embodiment, as the data is gathered for each user, it is sent through a change management process to determine what data is already contained, changed or deleted from the target device. Only data which has actually been changed or added is then sent down to the device in an atomic transaction format. This data is deposited into the user's transaction queue on the middle tier server 150. At this point data can optionally be compressed in order to minimize wireless bandwidth requirements.

Mobile Client

In an embodiment, a mobile client device application includes various components residing on the mobile device, including: database engine; transport protocol; user interface; business logic. The database engine and transport protocol, along with other support components, are part of the wireless workspace platform that performs data synchronizing functions with a server in the background, detects changes to data on an application data source, provides new data to the device, pushes new data generated/processed from the device to the application data source, and guarantees that the communication is reliable, secure, and/or available for different platforms. Aspects of these features, functions and components can be found U.S. patent application Ser. No. 11/757,087, filed Jun. 1, 2007, entitled "METHOD AND SYSTEM FOR PUSHING DATA TO A PLURALITY OF DEVICES IN AN ON-DEMAND SERVICE ENVIRONMENT", and hereby incorporated by reference.

Managing Recent Data Items in a Mobile Device

The present invention also provides systems and methods for managing data items, including recently viewed data items, in a mobile device linked to an on-demand database system or service. In certain aspects, systems and methods dynamically manage data accessible on a mobile device based on user behavior and/or user activity. In particular, data is mobilized on a per object basis. Mobilizing refers to synchronizing the records to the mobile device.

Figure 9:
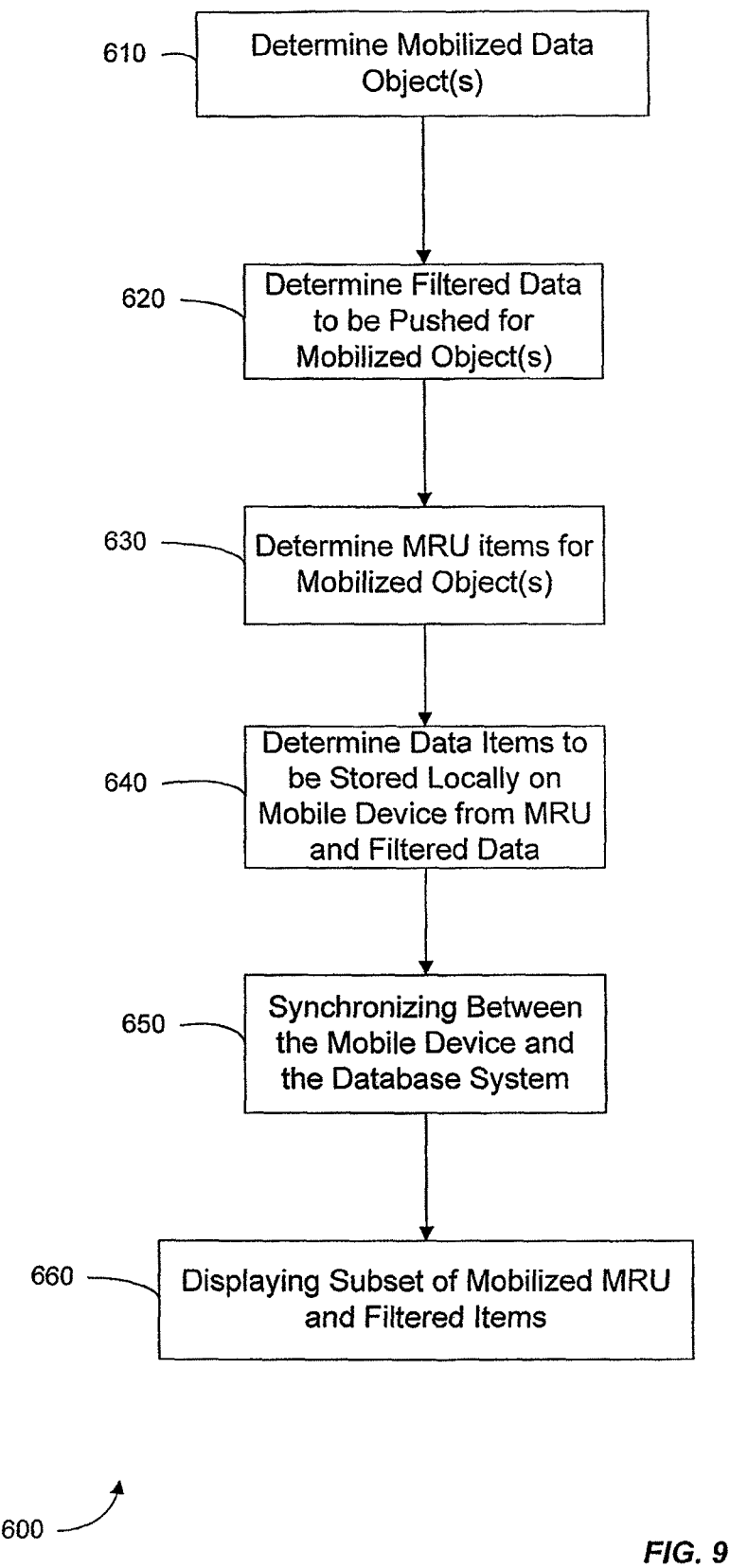
FIG. 9 illustrates a method of managing data stored on a mobile device in remote communication with an on-demand database system service according to one embodiment.
Figure 10:
FIG. 10 illustrates an example UI according to one embodiment.

FIG. 9 illustrates a method 600 of managing data stored on a mobile device in remote communication with an on-demand database system service according to one embodiment. In step 610, one or more logic modules determines whether a data object stored in the database system is mobilized. For example, for all data objects available to a user of a mobile device, the logic module(s) determine which objects have been identified or designated as able to be accessed by the user of the mobile device. The logic module(s) may be implemented in a single component (e.g., middle tier server, or data base server) of system 16, or the logic may be implemented across more than one component. In certain aspects, objects are designated (as mobilized) by an administrator or other user. In one aspect, the choice to mobilize the MRU is given as part of a mobile configuration header section and includes a check box (see, e.g., FIG. 10) to select that the MRU should be mobilized, and a drop down selection of the maximum number of records to mobilize from the MRU. The drop down include various values; e.g., 25, 50, 100, 200, etc.

In step 620, if an object is determined to be a mobilized object, a logic module determines filtered data to be pushed to the mobile device. For example, for all mobilized objects available to the user, one or more logic module(s) determine a set of data items from among the mobilized data objects based on user-defined or other criteria (See, e.g., FIGS. 5-8). A data item generally refers to a data record stored in an object or table, however, a data item may include a portions of record or a single data value (e.g., field of a record). Typically user-defined criteria includes tasks due today or within the next 7 days, or within some other time period. In step 630, the logic module(s) determine MRU items for a mobilized object. For example, for all mobilized objects available to the user, a set of one or more most recently used (MRU) data items is determined for the mobilized data objects. The MRU data items typically include data items in the mobilized objects that have been recently viewed or accessed (e.g., via CRUD operations) by a user of the mobile device. The items need not have been viewed by the user using the mobile device, but rather they need only have been viewed by the user who is now accessing information from the database system using the mobile device. Typically, the user accesses the data items from a mobile device via a web application through a middle tier server.

In step 640, for the mobilized objects available to the user, the logic module(s) determine a set of merged data items to be stored at the mobile device. The merged data items include data items from the filtered data determined in step 620, and MRU items determined in step 630. The set of merged data items is stored locally at the mobile device. For example, instructions and data items are sent from a middle tier server, or other database service component(s), to the mobile device. The MRU items may already be present on the mobile device (e.g., the user recently viewed the item on the mobile device or the item was uploaded to the mobile device along with filtered data and other MRU items), or they may need to be uploaded to the mobile device (e.g., in the case where a user was recently using a desktop computer to access information on the database service, and is now logged in and using the mobile device.

In step 650, information about the set of merged data items is synchronized with the mobile device so that the mobile device is able to store the merged set in local memory. Synchronization typically is ongoing, e.g., devices periodically synchronize with the database system per pre-defined configuration settings. The MRU in certain aspects, is mobilized as part of the regular device synchronization cycle (e.g., every 10 or 20 minutes or longer), so that, for example, a user who works online in the morning and then leaves the office for a meeting will find his mobile device represents the most recent context. Frequent synchronizing is not considered a problem, since the data is very explicitly known.

In step 660, at least a subset of the stored data is displayed on the mobile device. In certain aspects, the filtered and search data is merged or intermixed with the MRU data to provide a seamless display of relevant information to the user of the mobile device. In another aspect, the MRU data may be displayed separately.

According to one embodiment, the amount of each type of data stored on the mobile device dynamically varies. For example, in certain aspects, a certain portion or amount of memory is designated as available for storage of filtered data pushed to the device, as well as search results, and a certain portion or amount of memory is designated as available for storage of MRU data. In certain aspects, the amount of storage available on the device for the filtered data and the MRU data changes dynamically. In certain aspects, the filtered data takes precedence, and consumes as much memory as required. What is left over is used for MRU type data. As the filtered data set increases, the dynamic data set shrinks and visa versa. In certain aspects, however, a certain amount of memory, e.g., 5% or 10% or more may be reserved for MRU data.

In certain aspects, the MRU is treated as part of a marked data set. That means that even if the MRU size is small, the data on the device will gradually grow to a much larger MRU, as the marked records fill the available space on the device. This means the device will in essence be merging the MRU on the device with the system MRU. In one embodiment, the MRU data stored on a mobile device is periodically truncated, e.g., a portion of the MRU data is deleted from the memory. For example, each night (or other periodic basis) a percentage of the oldest MRU entries are deleted. The percentage truncated may be 10 or 20%, or even 30, 40 or 50%. In certain aspects less than about 30% is truncated. Timestamp values associated with the data items enable identification of MRU items to be truncated.

The most recently used (MRU) list or table includes the most recent items that the user has viewed. A visual recent list may be provided as a UI representation of data in an MRU table or object. Such a table may have a large number of recent items, grouped by object (e.g., as many as 25 per object or more). This recent items object represents excellent user context and mobilizing these records creates a seamless user experience for users who work in systems, such as salesforce.com, on Mobile and other systems.

In certain aspects, to mobilize the MRU, the real MRU for all records is merged out of the separate MRU lists for each object. In one aspect, only objects that are mobilized (e.g., defined by an administrator or other user as being accessible to mobile devices) are considered for building the MRU synchronization list.

Mobilizing the MRU refers to synchronizing the records to the mobile device. In certain aspects, the client recent items list view is populated for each object also. Records viewed or accessed on the device update the system MRU. This is possible when the client starts to sync back to the server its own daily MRU.

In certain aspects, objects that are on the MRU are automatically mobilized as a way to provide a zero administration functionality. However, in certain aspects, certain objects may be designated as not able to be mobilized. Also, in certain aspects, certain fields of objects may be designated as not able to be mobilized.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of managing data stored on a mobile device in remote communication with an on-demand database system, comprising:
   determining whether a user of the mobile device has permission to access a first data object managed by the on demand system;
   updating most recently used (MRU) data items in on demand service to reflect the most recently used set for the mobile device, wherein the on demand service includes a middle tier server;
   selecting data items from the first data object, using the middle tier server, to form a first set of data items for potential inclusion on the mobile device, the selecting data items based at least in part on a user-defined criteria filter;
   selecting a set of one or more of the MRU data items for the first data object for potential inclusion on the mobile device, the MRU data items selected based at least in part on activity with the items by the user; and
   storing locally at the mobile device a second set of data items from the first data object, the second set including data items from the first set of data items and from the MRU data items, excluding from the second set of data items fields of the first data object that are designated as not able to be mobilized and periodically truncating a portion of the MRU data items from the second set.

2. The method of claim 1, wherein the MRU data items are determined based on timestamp field values associated with data items of the first data object.

3. The method of claim 1, wherein selecting data items includes filtering data items in the first data object based on the user-defined criteria filter.

4. The method of claim 1, wherein storing includes periodically synchronizing data between the mobile device and the on demand database service so that the on demand service is updated with information about data items that have recent activity by the user on the mobile device.

5. The method of claim 1, wherein the portion truncated includes less than about 30% of the MRU data items as determined by timestamp values associated with the MRU data items.

6. The method of claim 1, further including displaying at least a portion of the second set of data items on the mobile device, wherein the MRU data items and first set of data items are merged together when displayed.

7. A method of managing data stored on a mobile device in remote communication with an on-demand database system, comprising:
 determining access permission for a user of the mobile device to a plurality of data objects that are managed by the on demand service;
 updating most recently used (MRU) data items in on demand service to reflect the most recently used set for the mobile device, wherein the on demand service includes a middle tier server;
 selecting data items from the plurality of designated data objects, using the middle tier server, to form a first set of data items for potential inclusion on the mobile device, the selecting based at least in part on user-defined criteria;
 selecting one or more of the MRU data items for potential inclusion on the mobile device, the MRU data item selection based at least in part on activity with the plurality of designated data objects by the user; and
 storing locally at the mobile device a second set of items from the designated plurality of data objects, the second set including data items from the first set of data items and from the MRU data items, and periodically truncating a portion of the MRU data items from the second set.

8. The method of claim 7, wherein the MRU items are determined based on timestamp field values associated with data items of the designated data objects.

9. The method of claim 7, wherein selecting data items includes filtering data items in the designated data objects based on the user-defined criteria.

10. The method of claim 7, wherein storing includes periodically synchronizing data between the mobile device and the on demand database system so that the on demand system is updated with information about data items that have been recently viewed by the user on the mobile device.

11. The method of claim 7, wherein the portion truncated includes less than about 30% of the MRU data items as determined by timestamp values associated with the MRU data items.

12. The method of claim 7, further including displaying at least a portion of the second set of data items on the mobile device, wherein the MRU data items and first set of data items are merged together when displayed.

13. An on demand database system, comprising:
 a database service including database storage that stores a plurality of data objects accessible by a plurality of users;
 a mobile device that communicates remotely with a component of the database service; and
 one or more logic modules executing on one or more components of the database service, wherein the one or more components of the on demand database system are remote from the mobile device, the one or more logic modules being configured to:
 determine access permission for a user of a mobile device to a plurality of data objects managed by the database service;
 update the MRU data items in a server component of the database service to reflect the most recently used set for the mobile device when data items are accessed by the user from a device other than the mobile device;
 select, by a middle tier server using a user-defined filter, data items from the plurality of designated data objects to form a first set of data items for potential inclusion on the mobile device;
 select one or more most recently used (MRU) data items for potential inclusion on the mobile device, the MRU data item selection based at least in part on activity with the plurality of designated data objects by the user of the mobile device; and
 send data to the mobile device identifying a second set of data items for storing locally at the mobile device, excluding from the second set of data items fields of the first data object that are designated as not able to be mobilized, the second set including data items from the first set of data items and from the MRU data items, and periodically truncating a portion of the MRU data items from the second set.

14. The system of claim 13, wherein the MRU items are selected based on timestamp field values associated with data items of the plurality of data objects.

15. The system of claim 13, wherein selecting data items includes filtering data items in the plurality of data objects based at least in part on the user-defined criteria filter.

16. The system of claim 13, wherein the mobile device and the on demand database service periodically synchronizes with the database service so that the on demand system is updated with information about data items that have been recently viewed by the user on the mobile device.

17. The system of claim 13, wherein the portion truncated includes less than about 30% of the MRU data items as determined by timestamp values associated with the MRU data items.

18. The system of claim 13, wherein the mobile device is configured to display at least a portion of the second set of data items on the mobile device, wherein the MRU data items and first set of data items are merged together when displayed.

19. A method of managing data stored on a mobile device in remote communication with an on-demand database system, comprising:
 determining whether a user of the mobile device has permission to access a first data object managed by the on demand system;
 updating most recently used (MRU) data items in on demand service to reflect the most recently used set for the mobile device, wherein the on demand service includes a middle tier server;
 selecting data items from the first data object, using the middle tier server, to form a first set of data items for potential inclusion on the mobile device, the selecting data items based at least in part on a user-defined criteria filter using a database index;
 searching a cached set of the MRU data items that includes data items that are awaiting indexing and selecting a set of one or more of the awaiting indexing MRU data items based at least in part on activity with the items by the user; and
 storing locally at the mobile device a second set of data items from the first data object, the second set including data items from the first set of data items and from the awaiting indexing MRU data items, and periodically truncating a portion of the MRU data items from the second set.

* * * * *